United States Patent
Goodno et al.

(10) Patent No.: US 9,966,722 B1
(45) Date of Patent: May 8, 2018

(54) FIBER LASER AMPLIFIER WITH SWITCHED MULTIPLE FIBER OUTPUT

(71) Applicant: Northrop Grumman Systems Corporation, Falls Church, VA (US)

(72) Inventors: Gregory D. Goodno, Los Angeles, CA (US); James G. Ho, Los Angeles, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days. days.

(21) Appl. No.: 15/626,328

(22) Filed: Jun. 19, 2017

(51) Int. Cl.
*H01S 3/067* (2006.01)
*H01S 3/094* (2006.01)
*H01S 3/23* (2006.01)

(52) U.S. Cl.
CPC .... *H01S 3/06754* (2013.01); *H01S 3/094003* (2013.01); *H01S 3/094038* (2013.01); *H01S 3/2383* (2013.01)

(58) Field of Classification Search
CPC ............... H01S 3/06754; H01S 3/2383; H01S 3/094003; H01S 3/094038
See application file for complete search history.

(56) References Cited

U.S. PATENT DOCUMENTS

2008/0304137 A1* 12/2008 Kakui .................. H04B 10/503
359/341.3
2013/0279527 A1* 10/2013 Jiang ..................... B41M 5/267
372/10

* cited by examiner

*Primary Examiner* — Dung Nguyen
(74) *Attorney, Agent, or Firm* — Patti & Malvone Law Group, LLC

(57) ABSTRACT

An internally switched fiber laser amplifier is disclosed and claimed. The switch is integrated directly into the fiber amplifier, so that the output power from each fiber amplifier can be switched between N selectable output fibers with minimal (approx. 1%) loss. The switch may be a close coupled pump switch, a spherical mirror or a planar mirror. The fiber laser amplifier may switch both pump and source lights, or may switch only the pump light then combine it with the source light before sending it to a gain amplifier.

22 Claims, 6 Drawing Sheets

FIBER LASER AMPLIFIER WITH SWITCHED MULTIPLE FIBER OUTPUT

GOVERNMENT CONTRACT

The Government of the United States of America has rights in this invention pursuant to Government Contract No. HR0011-15-C-0075 (DARPA).

BACKGROUND

The invention relates generally to fiber laser amplifiers and more particularly to a system and method for switching a high power amplified laser engine between multiple output fibers.

Laser weapons systems have been the subject of much research and development in recent years. These systems commonly employ optical fiber laser amplifiers that amplify light from a single-mode master oscillator laser output by using a pump laser to increase the output power of the system.

A common method to generate a high average power, near diffraction-limited beam for a directed energy (DE) laser weapon is to utilize spectral or coherent beam combining (SBC or CBC) of multiple narrow-linewidth fiber amplifiers in a laser engine. In SBC and CBC, light emitted from a laser engine comprising an array of fiber amplifiers is combined into a single free space beam. For many DE missions, particularly those related to air platform self-defense, it is advantageous to emit beams from multiple beam director turret locations on the platform to provide enhanced field of regard and protect against threats arriving from any angle. Yet to minimize payload size and weight (SaW), it is also advantageous to deploy only a single laser engine on the platform. Hence, there is a need to quickly and efficiently switch laser power from the laser engine between multiple beam director turrets. One technique used at DE-class power levels (typically 100 kW or more) is a free space optical switch, e.g., using one or more moving mirrors positioned downstream of an SBC or CBC beam combiner. This is impractical for numerous reasons.

One of these reasons is that such a system requires routing high power line-of-sight beams through the interior of the platform. Another reason is that large projection distances result in susceptibility to static and dynamic beam drifts and platform-induced jitter. In addition, large free space optics are susceptible to contamination and laser-induced damage. While all these issues are significant, the need for line-of-sight routing imposes the most severe constraint against integration on combat air platforms.

Figure 1:
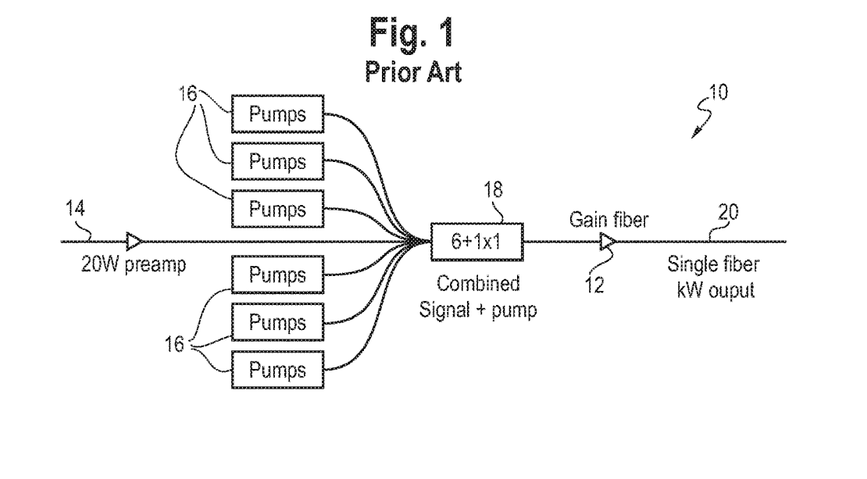
FIG. 1 is a diagram of a prior-art high power fiber laser amplifier stage.

A typical, prior-art high power fiber laser amplifier stage 10 is shown in FIG. 1. It comprises a dual-clad fiber 12, with a small doped core (typically ~20 um diameter) in which the signal laser light propagates in a single transverse mode, and a larger glass cladding (typically several hundred um diameter) in which relatively low-brightness diode pump light propagates. For a typical approximately 1-2 kW amplifier, the fiber core is seeded with 10 W or more of signal light 14, and the cladding is illuminated with 1-2 kW of pump light from pumps 16. Power is effectively transferred via lasing from pumps 16 to the signal as the two waves co-propagate in gain fiber 12. Typically, diode pump light 16 is combined with signal core light 14 in a pump-signal tapered fiber combiner 18, the output of which is spliced directly to the gain fiber 12 input. This amplifier architecture is mature and is widely used by commercial fiber laser suppliers. This architecture results in a single amplified fiber output 20.

High power fiber-to-fiber switches based on free space optics are widely used in the materials processing industry to switch between workstations. However such switches typically employ multimode fiber sources and multimode fiber targets. This is because the single-micron class tolerances required to switch with high efficiency into a single transverse fiber mode are very difficult to achieve and maintain. For SBC and CBC applications such as a DE laser weapon, however, it is required to use large mode area (LMA) fiber operating in a single transverse fiber mode. With 10 um-class fundamental mode field radius, coupling tolerances to overlap the source light with the target fiber core with <1% coupling loss are on the order of 1 um. Moreover, for <1% coupling loss the wavefront of the transmitted beam must be maintained to $\lambda/60$ RMS (root mean square). This is extraordinarily challenging for any optical system and to date has limited development of practical high power single-mode fiber-to-fiber switches based on free space optics. While single-mode fiber-to-fiber switches are commercially available for low power sources, they typically impose insertion losses on the order of approximately 1 dB (20%) or more, which for high power applications is unacceptably high.

Figure 2:
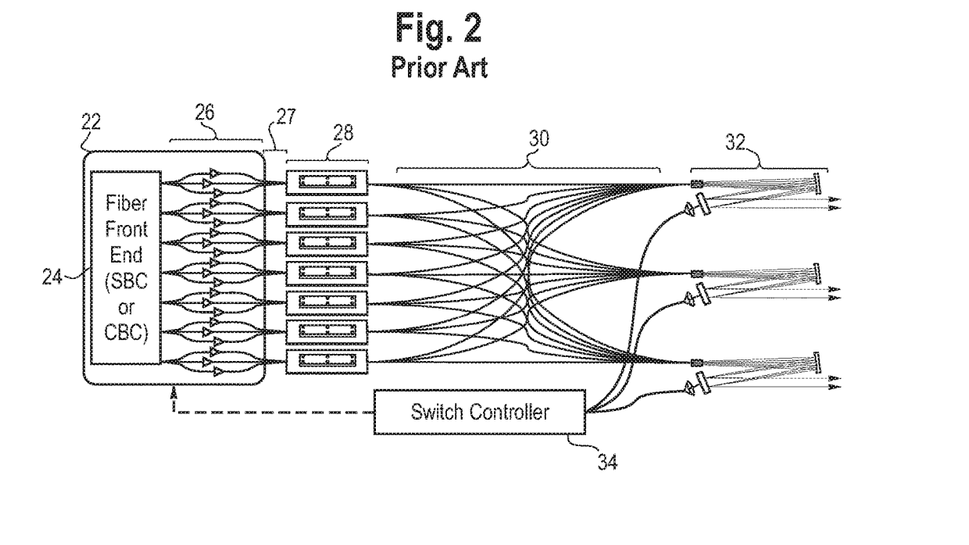
FIG. 2 is a diagram of a prior art single-laser engine, multi-turret, fiber-switched architecture.

A single-laser engine, multi-turret, fiber-switched architecture for DE applications has been disclosed in U.S. Pat. No. 8,488,235, as represented in FIG. 2. This patent discloses a method to scale per-fiber power. Laser engine 22 includes a laser master oscillator source 24 that seeds amplifiers 26, each of which generally corresponds to a fiber laser amplifier 10 of FIG. 1. The outputs of fiber amplifiers 26 are coherently combined into single delivery fibers 30, which then feed into free-space optical beam combiners 32 (based on either SBC or CBC) that are located proximate to each beam director turret. In this prior art, tapered fiber bundle (TFB) fiber splitters 28 are utilized in reverse as a fiber combiner, where each input fiber 27 to a respective TFB is spliced to the output of a fiber amplifier 26. If the amplifier outputs are mutually coherent and properly phase-locked and polarization-locked using servo control methods, then nearly 100% of the input light can be combined into any of the output fibers 30 from a respective TFB. The TFB output can be directed via coherent switching to any of its output fibers by changing the piston phases between the inputs by switch controller 34. Multiple TFBs 28 can be arranged as shown in FIG. 1 to enable a single laser engine 22 to feed multiple SBC or CBC beam turrets 32.

While the architecture of U.S. Pat. No. 8,488,235 appears viable, it is not necessarily optimum for all DE architectures, whether based on SBC or CBC. Some of the drawbacks of U.S. Pat. No. 8,488,235 are as follows:

For example, it can be advantageous to configure a CBC beam combiner as a tiled phased array to enable high speed, all-electronic beam steering for aim point maintenance on target. In such a tiled configuration, it is advantageous to maintain as many laser tiles as practicable to provide the largest possible pointing control range (which scales directly with the number of laser tiles). The architecture of U.S. Pat. No. 8,488,235 results in a reduction of the number of laser tiles by a factor equal to the number of turrets N; e.g. switching between N=3 turrets as shown in FIG. 1 would reduce the number of tiles, and the beam steering range, by 3× compared to the number of fiber amplifiers.

Another drawback of U.S. Pat. No. 8,488,235 is that the power in the delivery fiber is increased by a factor of N over that of any individual amp. This can enhance nonlinear optical impairments (self phase modulation and stimulated Brillouin scattering) that either reduce the combining efficiency (for CBC), degrade beam quality (for SBC), or directly limit the power output. To avoid significant performance limitations from such nonlinear impairments it is typically necessary to limit routing fiber lengths to <10 m, which may be insufficient for some applications, or to limit per-fiber power, which can increase system SaW by requiring more fiber amplifiers.

Another potential drawback of U.S. Pat. No. 8,488,235 is that it requires coherence between the N laser channels that are to be combined and switched. This imposes additional system complexity when used to feed a subsequent set of beam combiner turrets based on SBC, since CBC control electronics must also be included in the laser engine. It also imposes superfluous combining loss in the form of decohered light which will be lost in TFBs 28, but which could have otherwise contributed to the brightness of the SBC output beam.

Another potential drawback of U.S. Pat. No. 8,488,235 is that it requires splicing a TFB to the high power output of each fiber amplifier. While it may be possible to improve TFB losses, to date no high power TFB has been demonstrated with <10% insertion loss, which directly impacts system efficiency (hence driving SaW).

Thus, there is a need for a high power laser engine architecture that overcomes the deficiencies of the prior art. There is a further need for a switched multi-fiber amplifier that is switchable between multiple output turrets with flexible routing, fast switching speeds (<100 ms) to support agile re-targeting against multiple threats, and insensitivity to platform deformations or contamination environment.

SUMMARY

The invention in one implementation encompasses a switched multi-fiber amplifier where the switch is integrated directly into the fiber amplifier, so that the output power from each fiber amplifier can be switched between N selectable output fibers with minimal (approx. 1%) loss. There is a further need for an improved switched multi-fiber amplifier having incremental growth in SaW compared to an unswitched architecture.

In an embodiment, the invention encompasses a fiber amplifier system having a laser engine further comprising a signal light source and a plurality of pump light sources; a combiner for combining the signal light and the plurality of pump lights into a switch source fiber; a switch for receiving an input from the switch source fiber and switching it between a plurality of switch target fibers; a plurality of high power amplifier fibers each operatively coupled to a switch target fiber; and a plurality of output fibers each coupled to an output of a respective high power amplifier fiber.

In a further embodiment, the invention encompasses a fiber amplifier system including a laser engine further comprising a plurality of pump light sources and a signal light source; a pump combiner for combining the plurality of pump light into a switch source fiber; a switch for receiving an input from the switch source fiber and switching it between a plurality of switch target fibers; a splitter for receiving the signal light and splitting it into a plurality of outputs; a plurality of pump-signal combiners each receiving one of the switch target fibers and one of the outputs from the splitter; a plurality of high power amplifier fibers each receiving an input from a respective pump-signal combiner; and a plurality of output fibers each coupled to a respective high power amplifier fiber.

In either of the above embodiments, the switch is a free space switch.

In any of the above embodiments, the switch is a close coupled pump switch.

In any of the above embodiments, the switch is a spherical mirror that is operatively coupled to one or more actuators for controlling movement of the spherical mirror.

In another embodiment, the switch is a planar mirror that is operatively coupled to one or more actuators for controlling movement of the planar mirror.

In any of the above embodiments, the switch source fiber has an etendue less than that of the switch target fibers.

In any of the above embodiments, the plurality of high power amplifier fibers emit approximately 1.5 kW.

In any of the above embodiments, the plurality of high power amplifier fibers exhibit approximately >20 dB of saturated gain.

In any of the above embodiments, the switch source fiber has a diameter of approximately 50 to 300 µm and the plurality of target fibers have diameters of approximately 100 to 400 µm.

BRIEF DESCRIPTION OF THE DRAWINGS

Features of example implementations of the invention will become apparent from the description, the claims, and the accompanying drawings in which:

DETAILED DESCRIPTION

Reference will now be made in detail to one or more embodiments of the invention. While the invention will be described with respect to these embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention. Although specific dimensions of various features have been given, these are representative so as to illustrate aspects of the invention.

Figure 3:
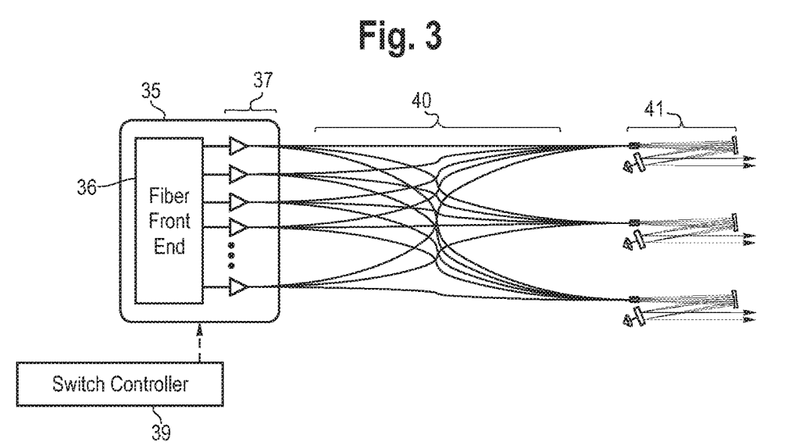
FIG. 3 is a diagram of a switched laser weapons system including a fiber switched amplifier according to the present invention.

In an embodiment, the invention encompasses a switched laser weapons architecture using internally switched fiber laser amplifiers as shown in FIG. 3. Similarly to FIG. 2, the system uses laser engine 35 and fiber front end (master oscillator source) 36 to feed switched laser amplifier channels 37. Each switched laser amplifier channel 37 can be controlled with switch controller 39 to direct the laser light output from fiber front end 36 to one of M (M=3 as shown in the example of this figure) output delivery fibers 40. Each of output fibers 40 is tethered to a remotely located beam combiner 41 based on either CBC or SBC, which is in close proximity to a beam delivery turret (not shown) that directs the combined laser beam toward a target.

Figure 4:
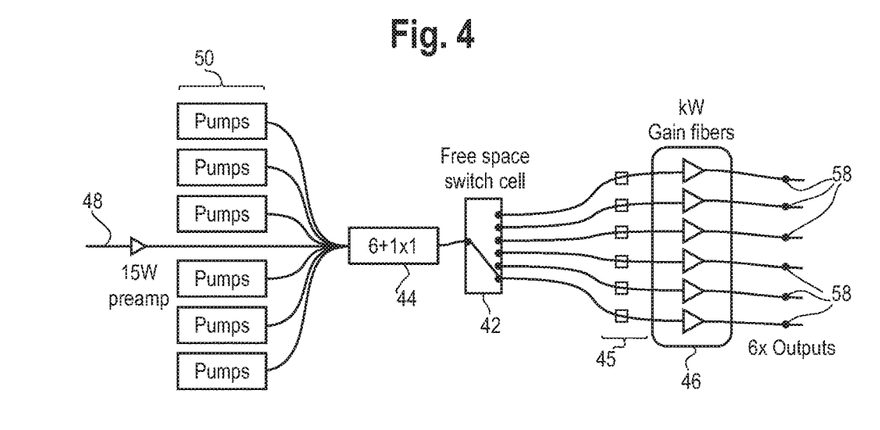
FIG. 4 is a schematic diagram of the internally switched fiber laser amplifier of FIG. 3.

A representative internally switched fiber laser amplifier 37 of FIG. 3 is shown in more detail in FIG. 4. As in FIG. 1, signal light 48 and pump light from a plurality of pumps 50 are combined in pump-signal combiner 44. A 1×N optical switch 42 is inserted between the output of combiner 44 and the input to each of N kW class fiber amplifiers 46. Amplifiers 46 couple amplified light to output fibers 58, each of which are coupled to a spatially remote terminus (not shown). In an embodiment, this terminus may be a laser beam combiner based on spectral beam combining (SBC) or coherent beam combining (CBC), a beam directing turret, a workstation for laser materials processing, or another application, for example. As shown in FIG. 4, N=6, however any appropriate number of fiber amplifiers may be used. Switch 42 can, in its most simple realization, comprise a curved mirror that can be remotely actuated to direct light from a single fiber source to multiple fiber receivers.

When switch 42 is located as shown in FIG. 4, the architecture is tolerant to switching loss of the fundamental mode signal ("loss" referring to coupling loss into the fundamental core mode). This is because any loss in the input signal 48 is made up in laser gain in each highly saturated fiber amplifier 46, with minimal impact to efficiency. For example, if a 20 W signal light is switched with 50% loss into a nominally 1 kW amplifier, the laser gain will increase by 3 dB (2×) while still extracting nearly the same 980 W from the amplifier, leading to 990 W total output in comparison to the original 1 kW. This is only an approximately 1% efficiency penalty despite 50% input coupling loss. To prevent amplification of higher order core modes (HOMs), a mode filter 45 is inserted in each fiber channel between switch 42 and each of amplifiers 46 to filter HOMs into the fiber cladding where they will not be amplified. In an embodiment, the mode filter comprises a fiber coil, although other filter elements may be used. This architecture relaxes optical tolerances by approximately one order of magnitude compared to direct switching of signal light with <1% loss.

Figure 5:
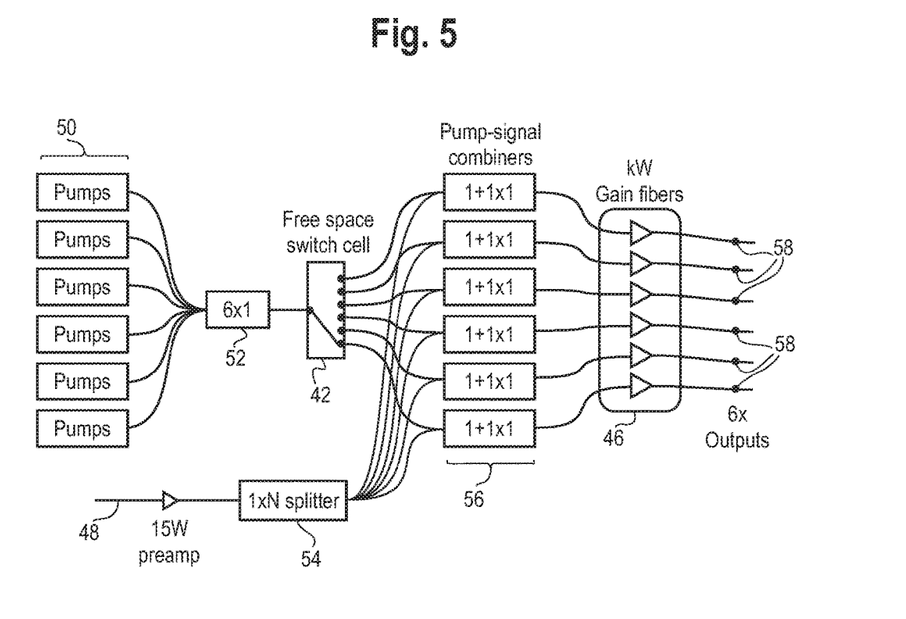
FIG. 5 is a schematic diagram of an alternate embodiment of a fiber switched amplifier according to the present invention.

An alternative embodiment is shown in FIG. 5. Elements in common with FIG. 4 have the same reference numbers. In this embodiment, only the pump light from pumps 50 is switched. The pump light is combined in 6×1 combiner 52 then sent to switch cell 42. Signal light 48 is transmitted through 1×N splitter 54 to N pump-signal combiners 56 and then to N kW class fiber amplifiers 46. Amplifiers 46 couple amplified light to output fibers 58, each of which are coupled to a spatially remote terminus (not shown). In an embodiment, this terminus may be a laser beam combiner based on spectral beam comining or coherent beam combining, a beam directing turret, a workstation for laser materials processing or another application, for example. As in the embodiment of FIG. 4, N=6 however, the invention is not limited to a specific number of pump sources and amplifier outputs.

A key advantage of the embodiment of FIG. 5 compared to the architecture of FIG. 4 is a relaxed requirement for opto-mechanical precision in the switch cell 42. The fiber positioning tolerance in the switch cell in the FIG. 5 embodiment is driven by the relative sizes and etendues of the source and target fibers. For example, if the target fiber diameter is 100 μm larger than the source fiber, than the source fiber can be misaligned by +/−50 μm without impact to coupling efficiency. In contrast, for the embodiment of FIG. 4, the fiber positioning tolerance is typically driven by the acceptable loss budget for signal light. For example, with typical 20 μm diameter signal cores, the fibers can be misaligned by no more than +/−10 μm regardless of the relative outer diameters of the source and target fibers. Thus, tolerances when coupling pump-only fibers (FIG. 5) are much relaxed than when coupling pump+signal fibers (FIG. 4).

Figure 6A:
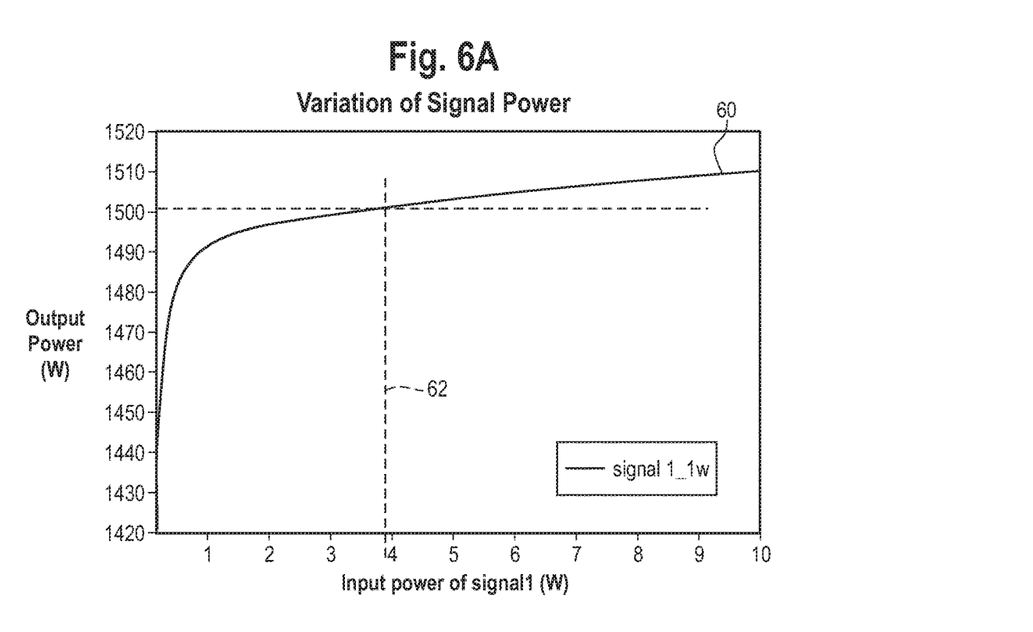
FIGS. 6A-6B are plots showing extraction efficiency for an amplifier according to the present invention.
Figure 6B:
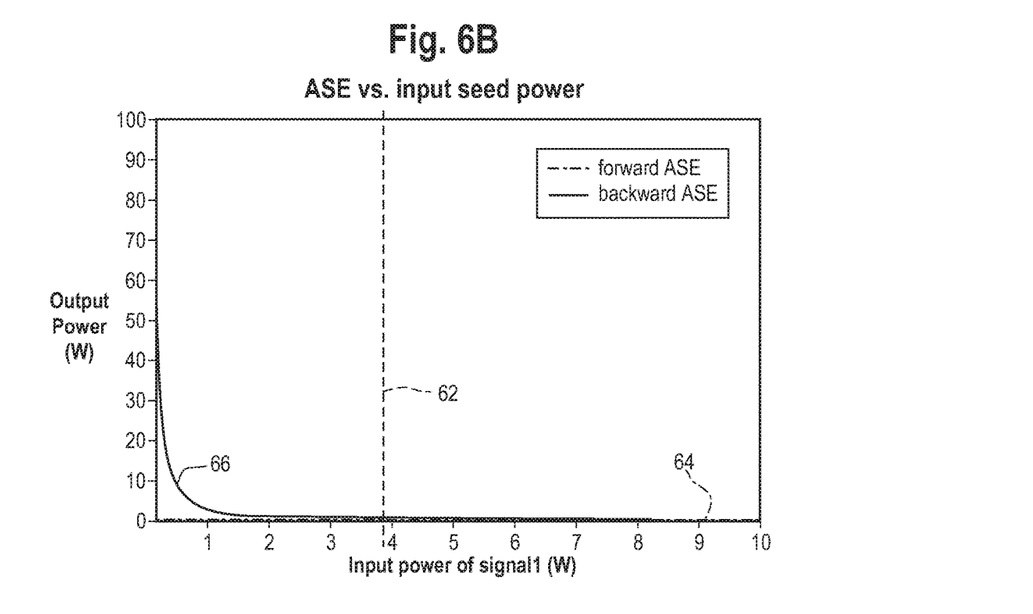

FIGS. 6A-6B show the results of a simple co-pumped, dual-clad fiber laser amplifier model according to the embodiment of FIG. 5 that simulates the impact of input signal power loss on extraction efficiency. The parameters for this simulation are based on commercially available amplifiers, for example, 1.5 kW Nufern® amplifiers, using 20 μm core/400 μm cladding fiber. FIG. 6A shows a plot 60 of signal input power in watts vs. output power, for example, of one of amplifiers 46 of FIG. 5. With nominal 15 W seed signal power available, up to 80% loss of the signal coupling can be tolerated without substantial impact to extraction efficiency. Ultimately the limit is driven by good engineering practice to keep the amplifier stage gain<30 dB to avoid instability or feedback sensitivity, and a need to keep amplified stimulated emission (ASE) power levels below approximately 100 mW. FIG. 6B depicts forward ASE 64 and backward ASE 66 as a function of input and output power in watts. As shown by line 62, approximately 75% loss in power of the seed signal (drop from 15 W nominal to 3.75 W) results in only a 1% drop in system efficiency (from 1515 W to 1500 W) and keeps ASE power levels well below 1 W. For ease of illustration, the x-axis in FIGS. 6A and 6B has been truncated at 10 W. The slope of lines 60, 64 and 66 does not change significantly between 10 W and 15 W.

Figure 7:
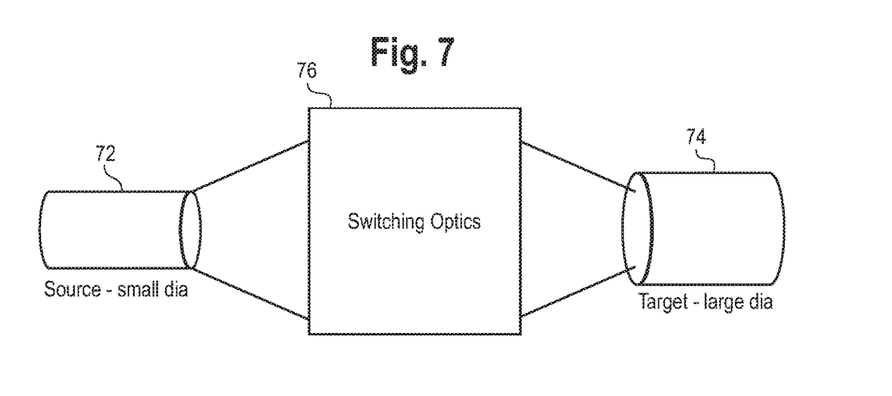
FIG. 7 is a schematic diagram illustrating relative diameters of input and output fibers for a switch according to the present invention.

While signal coupling efficiency has little impact on overall laser efficiency, pump coupling efficiency is critical since this is a multiplier to the laser system efficiency. The key to high pump coupling efficiency is to utilize high brightness fiber coupled diodes at the switch input to underfill the acceptance etendue of the target gain fiber and achieve high tolerance to free space reimaging aberrations, misalignment, and relaxed optical and mechanical tolerances. This concept is illustrated in FIG. 7. A source fiber 72 from combiner 44 of FIG. 5, for example, is coupled to a target fiber 74 by switching optics 76. Switching optics 76 such as commercial pump diodes can couple approximately 4 kW or more into an industry-standard 0.46 NA (numerical aperture), 400 μm diameter target fiber 74. If instead the same brightness diodes were used to fill the etendue of a smaller 300 μm diameter source fiber, the power would be $(300/400)^2 * 4$ kW=2.3 kW, sufficient to realize an approximately 2 kW amplifier (assuming typical approximately 85% pump-signal conversion efficiency). In an embodiment, switching optics 76 is a multi-kW fiber switch from IPG Photonics® switching a 50 μm fiber input to a 100 fiber output.

Figure 8:
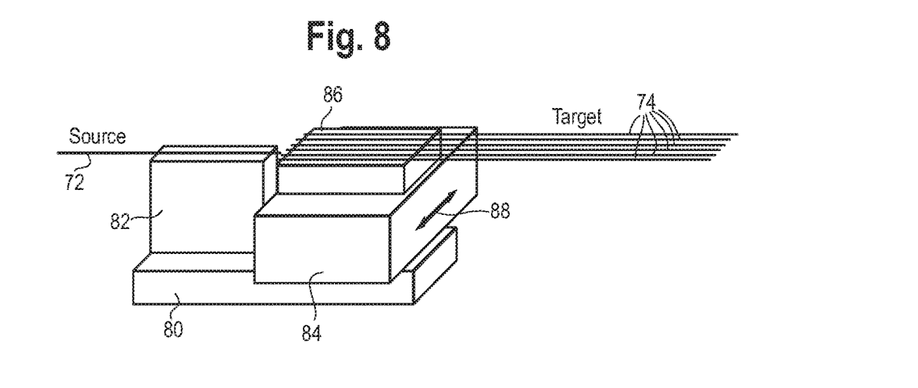
FIG. 8 is a schematic diagram of a close coupled pump switch cell.

A representative embodiment of a switch according to the present invention is shown in FIG. 8, which depicts a close coupled pump switch cell layout. Base 80 is made from a low coefficient of thermal expansion material, for example, Invar®, approximately 40 mm long by 30 mm wide by 20 mm high, although any appropriate dimension could be used. Base 80 supports fiber source sub-mount 82 and movable stage 84. Stage 84 is movable on base 80 in the direction of arrow 88. Fiber source sub-mount 82 supports source fiber 72 of FIG. 7 in a V groove. Stage 84 supports v-groove array 86 which holds target fibers 74 of FIG. 7 in individual V grooves. While six target fibers are shown, any appropriate number could be used. Source fiber 72 and target fibers 74 are coated with anti-reflective coatings and separated by an approximately 50 µm gap. In operation, source fiber 72 is switched between target fibers 74 by moving stage 84 in the direction of arrow 88. In an embodiment, either a built-in encoder or optical feedback is optionally used to ensure co-alignment.

Figure 9:
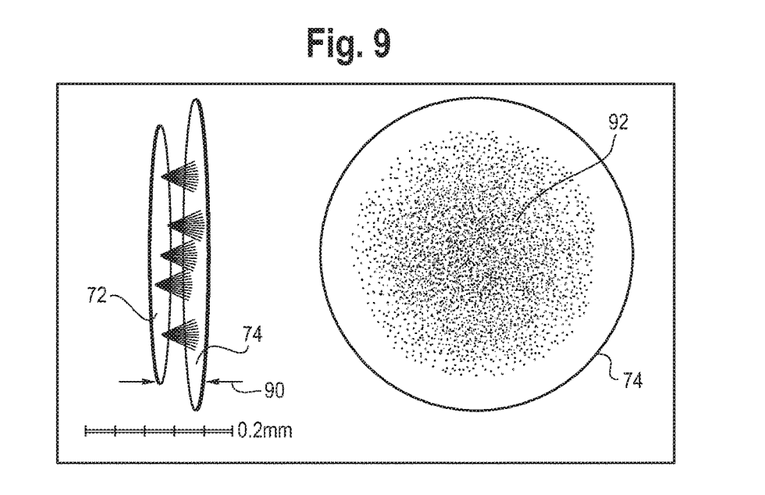
FIG. 9 illustrates the transfer of light between source and target fibers of FIG. 7.

The left hand side of FIG. 9 illustrates a side view of the transfer of light between source fiber 72 and any one of target fibers 74 of FIG. 8. In this example, source fiber 72 is a 300 diameter fiber while target fiber 74 is a 400 µm diameter fiber. They are separated by gap 90, for example, 50 µm wide, so as to allow the operation of stage 84 to smoothly and accurately switch between target fibers with nearly 0% coupling loss. A cross section of target fiber 74 on the right side of FIG. 9 shows dot cloud 92 which is a ray trace of light hitting target fiber 74. As shown, all of dot cloud 92 is within target fiber 74, indicating an efficient coupling of light. By providing a target fiber that is larger than the source fiber, the system can withstand tens of micrometers of relative misalignment with no impact to coupling efficiency. More generally, the etendue (i.e., the product of the fiber cross sectional area and the fiber numeric aperture) of the source fiber should be less than the etendue of the target fiber to ensure near 100% coupling efficiency with tolerance for misalignment.

Figure 10:
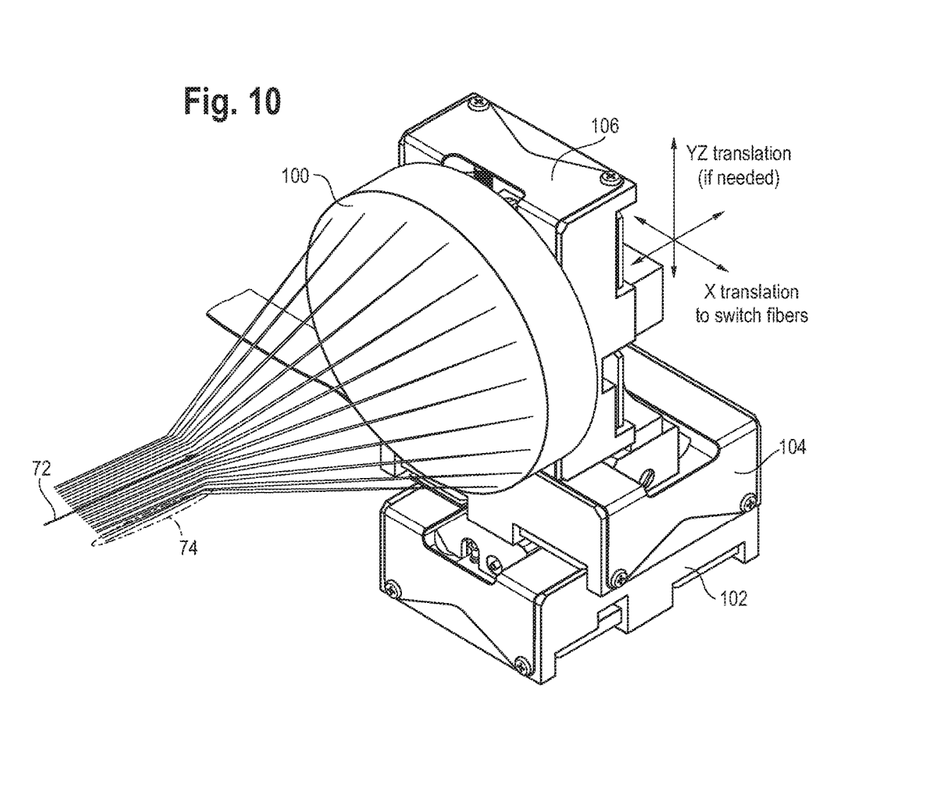
FIG. 10 is an alternate embodiment of a switch cell according to the present invention.

An alternative embodiment of the invention is shown in FIG. 10. In this embodiment, a spherical mirror 100 receives light from source fiber 72 of FIG. 7, for example, and reflects it into one of target fibers 74. In an embodiment, mirror 100 has a 20 mm radius of curvature, source fiber is 300 µm in diameter and target fibers are 400 µm in diameter, for example. To switch source fiber 72 between target fibers 74, mirror 100 is mounted on a translation stage having one or more actuators. FIG. 10 depicts an embodiment using Y translation actuators 102, X translation actuator 104 and Z translation actuator 106 which provide translation in three dimensions. In an embodiment, actuators 102, 104 and 106 are M3-LS USB micro stages from New Scale Technologies® but any appropriate actuator for controlling movement of mirror 100 could be used. As in the embodiment of FIG. 8, movement in the horizontal direction by means of X translation actuator 104 switches source fiber 72 between target fibers 74. X translation actuator 102 and Z translation actuator 106 allow further adjustment in situations where fibers 72 and 74 are not aligned or mirror 100 is tilted. These types of corrections can be performed at the initial testing of the system, or on an active basis while the system is in use. In an alternative, actuators could be used to control switching by moving source fiber 72 or target fiber array 74. In a further alternative, although target fibers 74 are shown in a horizontal array, they could also be positioned in a circle around source fiber 72.

An advantage of the embodiment of FIG. 10 over that of FIG. 8 is that fibers 72 and 74 of FIG. 10 may be fitted with end caps, which reduces the possibility of power damage and also reduces the load on cooling architecture for the device.

Figure 11:
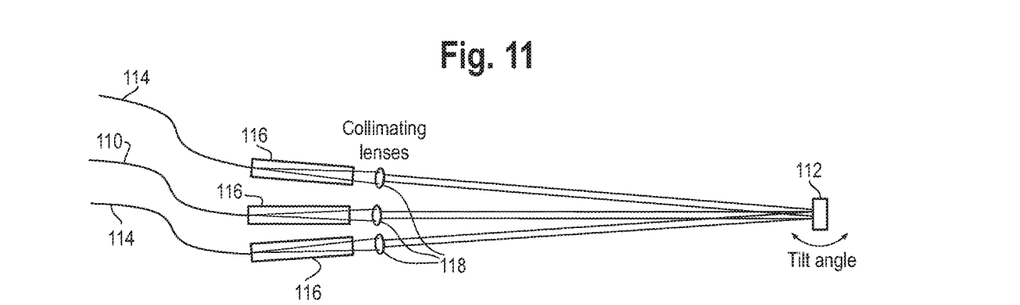
FIG. 11 is a further embodiment of a switch cell using a planar mirror.

Another alternate realization is shown in FIG. 11. Light emitted from source fiber 110 is switched by planar mirror 112 to one of target fibers 114. Each fiber is fitted with an end cap 116, which reduces the possibility of optical damage. Light entering and leaving end caps 116 is individually collimated by a respective collimating lens 118. Planar mirror 112 is tilted to direct light between source and target fibers. Although two target fibers are shown in FIG. 11, any number of target fibers may be used. Also, target fibers 114 may be aligned in a row with source fiber 110 as shown, or arranged in a circle around source fiber 110. Planar mirror 112 is attached to one or more actuators that provide tip and tilt control of planar mirror 112 in a way similar to that described for mirror 100 of FIG. 10.

The steps or operations described herein are just for example. There may be many variations to these steps or operations without departing from the spirit of the invention. For instance, the steps may be performed in a differing order, or steps may be added, deleted, or modified.

Although example implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A fiber amplifier system, comprising:
    a laser engine further comprising a signal light source and a plurality of pump light sources;
    a combiner for combining the signal light and the plurality of pump lights into a switch source fiber;
    a switch for receiving an input from the switch source fiber and switching it between a plurality of switch target fibers;
    a plurality of high power amplifier fibers each operatively coupled to a switch target fiber; and
    a plurality of output fibers each coupled to an output of a respective high power amplifier fiber.

2. The fiber amplifier system of claim 1, wherein the switch further comprises a free space switch.

3. The fiber amplifier system of claim 2, wherein the switch further comprises a close coupled pump switch.

4. The fiber amplifier system of claim 2, wherein the switch further comprises a spherical mirror.

5. The fiber amplifier of claim 4, wherein the spherical mirror is operatively coupled to one or more actuators for controlling movement of the spherical mirror.

6. The fiber amplifier system of claim 2, wherein the switch further comprises a planar mirror.

7. The fiber amplifier of claim 6, wherein the planar mirror is operatively coupled to one or more actuators for controlling movement of the planar mirror.

8. The fiber amplifier of claim 1, wherein the switch source fiber has an etendue less than that of the switch target fibers.

9. The fiber amplifier of claim 1, wherein the plurality of high power amplifier fibers emit approximately 1.5 kW.

10. The fiber amplifier of claim 1, wherein the plurality of high power amplifier fibers exhibit approximately >20 dB of saturated gain.

11. The fiber amplifier of claim 1, wherein the switch source fiber has a diameter of approximately 50 to 300 μm and the plurality of target fibers have diameters of approximately 100 to 400 μm.

12. A fiber amplifier system, comprising:
- a laser engine further comprising a plurality of pump light sources and a signal light source;
- a pump combiner for combining the plurality of pump light into a switch source fiber;
- a switch for receiving an input from the switch source fiber and switching it between a plurality of switch target fibers;
- a splitter for receiving the signal light and splitting it into a plurality of outputs;
- a plurality of pump-signal combiners each receiving one of the switch target fibers and one of the outputs from the splitter;
- a plurality of high power amplifier fibers each receiving an input from a respective pump-signal combiner; and
- a plurality of output fibers each coupled to a respective high power amplifier fiber.

13. The fiber amplifier system of claim 12, wherein the switch further comprises a free space switch.

14. The fiber amplifier system of claim 13, wherein the switch further comprises a close coupled pump switch.

15. The fiber amplifier system of claim 13, wherein the switch further comprises a spherical mirror.

16. The fiber amplifier of claim 15, wherein the spherical mirror is operatively coupled to one or more actuators for controlling movement of the spherical mirror.

17. The fiber amplifier system of claim 13, wherein the switch further comprises a planar mirror.

18. The fiber amplifier of claim 17, wherein the planar mirror is operatively coupled to one or more actuators for controlling movement of the planar mirror.

19. The fiber amplifier of claim 12, wherein the switch source fiber has an etendue less than that of the switch target fibers.

20. The fiber amplifier of claim 12, wherein the plurality of high power amplifier fibers emit approximately 1.5 kW.

21. The fiber amplifier of claim 12, wherein the plurality of high power amplifier fibers exhibit approximately >20 dB of saturated gain.

22. The fiber amplifier of claim 12, wherein the switch source fiber has a diameter of approximately 50 to 300 μm and the plurality of target fibers have diameters of approximately 100 to 400 μm.

* * * * *